Jan. 7, 1969 E. L. JOHNSON ET AL 3,420,328
ELECTRONIC SHIFT INDICATOR
Filed Jan. 30, 1967
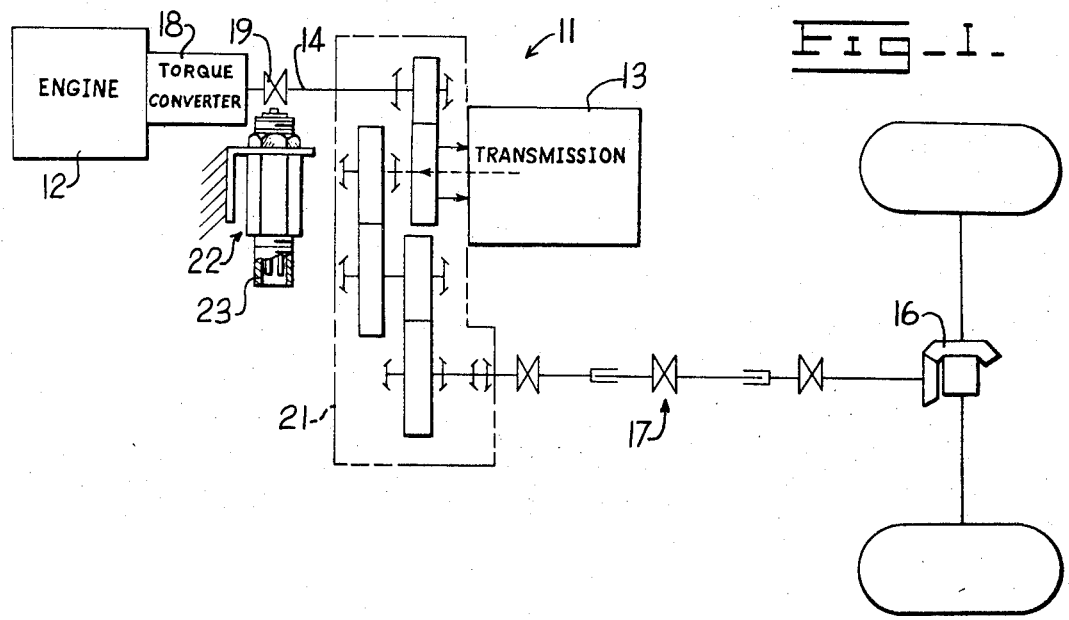
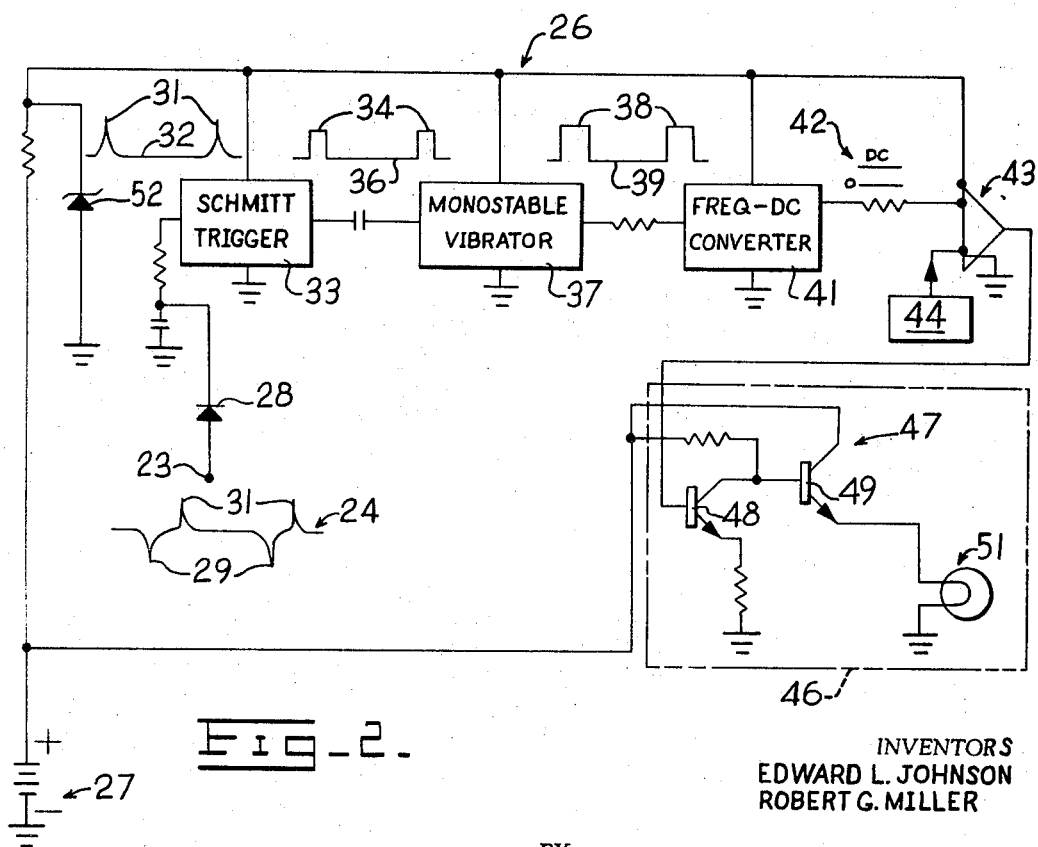
INVENTORS
EDWARD L. JOHNSON
ROBERT G. MILLER
BY
*Fryer, Tjensvold, Feix & Phillips*
ATTORNEYS

United States Patent Office 3,420,328
Patented Jan. 7, 1969

3,420,328
ELECTRONIC SHIFT INDICATOR
Edward L. Johnson, Peoria Heights, and Robert G. Miller, Princeville, Ill., assignors to Caterpillar Tractor Co., Peoria, Ill., a corporation of California
Filed Jan. 30, 1967, Ser. No. 612,430
U.S. Cl. 180—106                6 Claims
Int. Cl. B60k 23/00; G08b 21/00

ABSTRACT OF THE DISCLOSURE

Apparatus to control shifting of vehicle transmissions. An electrical circuit sensing operating speed, generating an electrical signal representative of said speed, comparing said signal with a constant signal representative of a speed permitting safe shifting of the transmission and actuating means to control shifting of said transmission.

Background of the invention

This invention relates to machines which are driven through transmissions and more particularly relates to vehicles wherein means are provided to control shifting of the vehicle transmission in the particular, but not limiting, circumstance where the vehicle is operating with the load tending to push the vehicle, as under downhill conditions.

The particular problem surrounding the present invention involves the inefficient operation of heavy vehicles, e.g. earthmoving equipment, by careless or undertrained operators. It has been observed that such operators improperly downshift to decelerate the vehicle while the load is tending to push the vehicle downhill and while the vehicle's ground speed is too great for safe operation in a lower gear. The undesirable effect of such improper downshifting is either overstressing of the transmission resulting in gear and clutch plate damage or overspeeding of the engine which leads to bending of exhaust valves.

Prior art devices have been much more commonly concerned with providing means for determining and indicating proper upshifting times. A common solution to proper upshifting problems is to provide two tachometers which indicate engine speed and vehicle speed. By referring simultaneously to the two tachometers, an operator may determine proper upshift time. However, the operator must visually check both instruments and make a mental comparison of their readings. With an inexperienced or careless operator, there is a tendency to ignore the above procedure.

Another priorly employed shift indicator comprises a pressure switch to detect transmission oil pressure to energize a battery operated lamp serving as a visual indication to the operator of the proper time to shift. However, this system involves complicated installation and adds to the problem of oil leakage at the point of communication of the indicator pressure switch with the transmission oil reservoir.

Thus, there remained a need for a simple and inexpensive shift indicator to control shifting of the transmission.

Summary of the invention

The present invention provides such a shift indicator which is novel, relatively simple and reliable. The present invention includes means disposed to detect operating speed and produce an electrical signal representative thereof. Electrical circuit means compare said signal with a constant electrical signal representative of a preselected speed below which shifting between transmission gear ratios may be safely accomplished without damage to engine or transmission. When the signal representative of operating speed exceeds the constant signal, an actuating current is supplied to actuate means controlling the shifting of the transmission.

Accordingly, one object of the present invention is to provide a vehicular shift indicator wherein it is necessary to monitor the speed of only a single element of the vehicle drive train.

Additional objects and advantages of the invention are made apparent by the above description of art and the following specification wherein a preferred form of the invention is described by reference to the accompanying drawing.

Brief description of the drawing

FIG. 1 is a schematic illustration of a preferred embodiment of the present invention wherein a drive train of an earthmoving vehicle including an engine, torque converter, and transmission with a suitably located drive shaft is equipped with a magnetic pickup device for providing an electrical signal corresponding to the vehicle ground speed.

FIG. 2 is a schematic illustration of an electronic circuit to receive the electrical signal from the magnetic pickup device and an indicator light to be actuated thereby as a visual indication to the vehicle operator of the proper time for downshifting.

Description of the preferred embodiment

Referring now to FIG. 1, the drive train 11 of a typical earthmoving vehicle comprises an engine 12 driving a transmission 13 through a transmission driveshaft 14. Transmission 13 drives a differential 16 in various gear ratios through an interconnecting differential driveshaft 17. A torque converter 18 disposed in drive train 11 between engine 12 and transmission driveshaft 14 to provide a "soft connection" between engine 12 and transmission 13. Transmission driveshaft 14 typically has a universal joint 19 therein. Drop box 21 and suitable gearing therein is preferably disposed to provide the driving linkage between transmission driveshaft 14 and transmission 13 and between transmission 13 and differential driveshaft 17.

Under work conditions, engine 12 may normally operate at an optimum selected speed of, e.g. 2,000 to 2,200 r.p.m., with corresponding ground speeds of, for example: in first gear ratio forward, 5.7 miles per hour; second gear ratio forward, 12.8 miles per hour; third gear ratio forward, 30.15 miles per hour. When engine 12 drives the vehicle, transmission driveshaft 14 rotates at a speed proportionally below the speed of engine 12 which is indicative of vehicle ground speed. However, when a load is pushing the vehicle, torque converter 18, e.g. by a lock-up device comprising an overrunning clutch arrangement therein (not shown), preferably causes a one-to-one speed ratio between the output of converter 18 and engine 12. When torque converter 18 is in the above-noted mode, the rotational speed of transmission driveshaft 14 is indicative of the operating speed of engine 12 as well as the vehicular ground speed. The purpose of the above lock-up feature is to prevent the natural tendency of the operator releasing the accelerator during downhill operation, thus slowing engine 12 to a speed too low to maintain the hydraulic system at sufficient output to safely steer and brake the vehicle. This lock-up feature is the immediate cause of the need for the apparatus provided by the present invention.

As an example, if a vehicle is heavily loaded, and traveling in third gear, and the road surface suddenly dropped off to a sharp decline, the weight of the load will immediately start pushing the vehicle, thus locking the engine 12-torque converter 18 output speed ratio at one-to-one, and as vehicle speed increases, engine speed also increases, even if the operator releases the accelerator. The natural tendency for operators in such a situation is to downshift to a lower gear ratio, to obtain a degree of braking. However, the same 2,000 to 2,200 r.p.m. speed of engine 12 is required to drive the vehicle at 12.8 miles per hour in second gear or 30.15 miles per hour in third gear and, consequently, a considerable gear and clutch ratio change occurs between second and third gear. Thus, when the load is pushing, i.e. the driving power is in reverse, a downshift from third to second gear with the engine-torque converter output ratio being one-to-one, could cause extreme stresses in the gears and clutches of transmission 13, as well as overspeeding of engine 12. Such downshifting action by operators and the resultant undesirable effects as described above has resulted in numerous instances of cracked planetary assemblies and damaged clutches in transmission 13 and bent exhaust valves in engine 12 of such vehicles.

The present invention provides novel apparatus to control downshifting, e.g. by warning the operator not to downshift or by preventing his movement of the shift lever until the vehicle ground speed is sufficiently reduced that downshifting will not result in damaging stresses in transmission 13 or overspeeding of engine 12 with resultant damage thereto. Reference is hereafter made to both FIGS. 1 and 2. Vehicle ground speed detecting means 22 is disposed adjacent universal joint 19. An electrical signal, representative of said operating speed is produced by detecting means 22. Preferably, speed detecting means 22 is a magnetic pick-up device which detects the rotational speed of universal joint 19 as an indication of operating speed and generates an electrical signal representative thereof at output connector 23. Universal joint 19 is of a conventional shape such that two cycles of electrical signal frequency are supplied at output 23 for each revolution of transmission driveshaft 14. The electrical output of magnetic pickup device 22 is illustrated as electrical signal wave form 24.

Electrical circuit 26 is electrically disposed to receive electrical signal 24 from magnetic pickup output 23. Generally, circuit 26 provides a constant electrical signal representative of an operating speed of engine 12 which is less than the optimum engine operating speed, (2,000–2,200 r.p.m.) by the same general relation as that between a lower gear ratio transmission output speed to the next higher gear ratio transmission output speed. When the electrical signal received from magnetic pickup 23 exceeds that constant electrical signal, circuit 26 generates an actuating electrical signal.

Preferably, circuit 26 is powered by a DC electrical source 27 and includes a diode 28 disposed to receive the output signal from magnetic pickup 23. Diode 28 clips negative going pulses 29 of signal 24 and passes positive pulses 31 to provide an electrical signal illustrated by wave form 32. A Schmitt trigger 33 is electrically disposed to receive the pulses which pass through diode 28 and responds thereto by generating a square wave output. Each square wave output begins as the input signal pulse rises above the knee voltage and terminates when the signal pulse drops below the knee voltage. Thus, each pulse 31 of signal 32 causes a single square wave output 34 in the electrical signal wave form 36 generated by trigger 33. The amplitude and duration of each square wave 34 is thus dependent upon the amplitude and duration of corresponding pulse 31 of trigger input signal 32. A monostable or "one-shot" multivibrator 37 is disposed to capacitatively receive signal 36 from trigger 33. Multivibrator 37 is of a type which produces square waves of equal amplitude and pulse width each time it is triggered to its unstable state by an input pulse. Thus, multivibrator 37 generates a constant value square wave 38 of multivibrator output wave form 39 for each single square wave 34 of input wave form 36. Multivibrator output signal 39 is applied to a frequency-to-DC converter 41 which averages the input constant value square wave signal 39 to DC signal output 42. Thus, the value of DC signal 42 is proportional to the speed of driveshaft 14 monitored as described above by detector 22.

Output signal 42 from frequency-to-DC converter 41 is electrically applied to an operational amplifier 43 which functions as a comparator. An adjustable DC source 44, which may be a potentiometer connected between the positive side of the power supply to amplifier 43 and ground, provides a constant DC reference signal of preselected value and is also applied to amplifier 43. In the present preferred embodiment and in relation to the exemplary values listed above for optimum engine speed and the various gear ratios of transmission 13, the constant DC reference signal from source 44 is selected to be representative of a driveshaft speed of 875±30 r.p.m. The relations of these values are further discussed infra in the operational description of the invention. When converter output signal 42 is less than the constant reference signal from DC source 44, amplifier 43 has no output. However, when signal 42 exceeds the source 44 constant reference signal, an actuating electrical signal is generated by amplifier 43.

A control means 46 is disposed to receive actuating signals from amplifier 43 and control changing or downshifting between gear ratios in transmission 13 in response thereto. Preferably, the actuating signal from amplifier 43 is fed into current amplifier 47 which is basically a flip-flop circuit including transistors 48 and 49 and associated circuitry as is normally contemplated in prior art practice. Output transistor 49 is normally conducting, in the absence of an actuating signal, and is electrically connected with indicator light 51 so that light 51 is normally "on" i.e. in the absence of an actuating signal. When an actuating signal is generated by operational amplifier 43, transistor 49 is driven into a nonconducting mode such that light 51 turns "off." Light 51 is further disposed to be visible by the vehicle operator and to serve as an indication of when he can safely downshift. Normally, light 51 will be "on" indicating that downshifting is safe. However, when driveshaft 14 exceeds the preselected speed for which DC source 44 provides a representational signal, an actuating signal is delivered to current amplifier 47, deactivating light 51 to "off" and indicating to the operator that it is unsafe to downshift.

To provide driving power to circuit 26 and to current amplifier 47, DC source 27 is preferably the vehicle battery associated with engine 12 of power train 11. The output voltage of battery 27 is regulated to, e.g. 15 volts by a diode 52 and applied to trigger 33, vibrator 37, converter 41 and operational amplifier 43 to provide power therefor. Full battery voltage is supplied as B+ to current amplifier 47.

In operation of the above-described preferred embodiment engine 12 and transmission 13 are particularly subject to damage during downshifting from third gear to second gear, as there is a 17.35 miles per hour change in ground speed. Therefore it is particularly important in downshifting from third gear to second gear, during downhill acceleration, that the vehicle operator first brake the vehicle to reduce operating ground speed to a safe level.

Assuming a situation where a vehicle comprising drive train 11 is being operated in third gear on a downhill slope, the engine 12 and torque converter 18 output are operating at a one-to-one speed ratio. Magnetic pickup device 22 detects vehicle speed and generates an electrical pulse signal with a frequency proportional thereto. Circuit 26 converts the pulse signal from pickup 22 to a DC signal the value of which is also proportional to operating speed. When the speed-proportional DC signal is compared with and exceeds a constant DC reference signal from DC source 44, an actuating signal passes from circuit 26 to indicator light 51 by means of current amplifier 47.

The following illustrates the manner in which the present apparatus effectively indicates when downshifting e.g. from third to second gear, may be safely accomplished assuming an optimum operating speed of engine 12 of 2,000–2,200 r.p.m. Engine 12 is susceptible to damage during operation above that speed. The DC reference signal from source 44 is proportional to a rotational speed in transmission driveshaft 14 and, accordingly, engine 12 of 875±30 r.p.m. Also note above that, at the optimum speed of engine 12 (2100 r.p.m.) vehicular ground speed is 30.15 miles per hour in third gear and 12.5 miles per hour in second gear. By comparing the ratio of optimum engine speed (2,100 r.p.m.) and the speed to which the reference DC signal is proportional (875 r.p.m.) with the ratio of vehicular ground speed in third gear (30.15 m.p.h.) and in second gear (12.5 m.p.h.), operation of the invention is readily seen. When driveshaft 14 and engine 12 are rotating at less than 875 r.p.m., the vehicle may be downshifted from third to second. Since ground speed will tend to remain constant, operating engine speed is increased by the ratio of third gear ground speed to second gear ground speed. By the above-noted values, it is thus apparent that operating engine speed will not be increased above its optimum speed of 2,200 r.p.m. under the control provided by the present invention.

Although the drive train overstressing caused by downshifting from second gear to first gear is less severe than that caused by downshifting from third to second, the present invention is equally effective in the control there provided.

Although the present invention has been described above with particular reference to a single preferred embodiment, the scope of the invention is not thereby limited. For example, indicator light 51 of control means 46 may be ignored by the operator since it is a visual indicator. However, control means 46 may also comprise a shift lockout device which would make it physically impossible to shift gears at the wrong time. Further, the invention is described with detector 22, circuit 26 and control means 46 integral to drive train 11. However, the present invention also contemplates adaptability of those components for incorporation into existing vehicles.

What is claimed is:

1. In a machine having a variable speed driving means characterized by an optimum operating speed, and a transmission driven by the driving means wherein the transmission has at least a first gear ratio and a second gear ratio and means for shifting therebetween, the combination comprising:

detector means disposed to detect the speed of the driving means and produce an electrical signal proportional thereto;

reference means providing a constant intensity electrical signal representative of a preselected operating speed below which a shift of the transmission gear ratios may be safely accomplished;

signal means disposed to receive the signal from said detector means and the signal from said reference means and responsive to the former being greater than the latter to issue an actuating signal; and means associated with said signal means for receiving and responding to the actuating signal.

2. In a vehicle powered by an engine through a transmission, the combination comprising:

a variable speed engine having an optimum speed;

a transmission coupled to be driven by said engine and having a variable power output speed to drive said vehicle, said transmission operable in at least first and second gear ratios and adapted to shift between said gear ratios, said transmission gears providing respectively lower and higher transmission output speeds for a given engine speed, said lower output speed corresponding to said first transmission gear ratio being a preselected fraction of said higher output speed corresponding to said second transmission gear ratio;

detector means disposed to detect said engine operating speed and produce an electrical signal representative thereof;

electrical circuit means disposed to receive said detected electrical signal, said circuit means providing a constant electrical signal representative of an engine operating speed which is less than said optimum engine operating speed by said preselected output speed fraction, said circuit means generating an actuating electrical signal when said electrical signal representative of said detected engine speed exceeds said constant electrical signal; and means associated with said electrical circuit means for receiving and responding to the actuating electrical signal.

3. In a vehicle according to claim 2 wherein said vehicle is driver operated, the combination further defined by said receiving means being a signal light disposed to be visible to said operator and being operated by said actuating signal.

4. The vehicle of claim 3 wherein said detecting means comprises a magnetic pickup disposed to detect the rotational speed of said engine-transmission coupling and generating an electrical signal of positive and negative electrical pulses, said signal having a frequency proportional to said coupling speed; and wherein said electrical circuit means comprises:

a Schmitt trigger having a diode disposed to receive said electrical signal from said magnetic pickup and pass only the positive pulses to said Schmitt trigger, said Schmitt trigger generating an electrical signal consisting of a single square wave output for each input positive pulse received through said diode, said square waves having variable amplitudes and durations;

a monostable multivibrator adapted to receive said variable square wave output from said Schmitt trigger and generate a constant value square wave signal;

a frequency-to-DC converter disposed to receive and average said contsant value square wave signal from said multivibrator and generate a DC signal proportional to the speed of said coupling;

an operational amplifier disposed to receive said converter DC signal and to receive said constant electrical signal in the form of a constant DC signal, said operational amplifier intermittently generating an electrical signal only when said converter DC signal exceeds said constant DC signal; and a current amplifier disposed to receive said intermittently generated electrical signal from said operational amplifier and generate said actuating electrical signal at a suitable amplitude to actuate said signal light.

5. The vehicle of claim 3 adapted to prevent damage to the transmission or engine by downshifting of said vehicle in accelerating during downhill descent, wherein:

a torque converter is disposed in the drive coupling between said engine and said transmission, said torque converter locking into a one-to-one speed ratio between said engine and said transmission during said downhill acceleration; and said detecting means comprises a magnetic pickup disposed to detect the rotational speed of said engine transmission coupling between said torque converter and said transmission.

6. Apparatus adaptable to a vehicle having an engine with a maximum speed and a variable operating speed and a transmission coupled to be driven by said engine and having a variable speed power output to drive said vehicle, said transmission operable in at least first and second gear ratios and adapted to shift between said gear ratios, said transmission gears providing respectively lower and higher transmission output speeds for a given engine speed, said lower output speed corresponding to said first transmission gear ratio being a preselected fraction of said higher output speed corresponding to said second transmission gear ratio, the combination comprising:

means disposable to detect said engine operating speed and produce an electrical signal representative thereof;

circuit means disposable to receive said detected electrical signal, said circuit means providing a constant electrical signal representative of an engine operating speed which is less than said maximum engine operating speed by said preselected output speed fraction, said circuit means generating an actuating electrical signal when said electrical signal representative of said detected engine speed exceeds said constant electrical signal; and means associated with said circuit means for receiving and responding to the actuating signal.

References Cited

UNITED STATES PATENTS

| | | |
|---|---|---|
| 2,734,161 | 2/1956 | Fryklund. |
| 2,968,803 | 1/1961 | Lindley _____ 340—263 X |
| 3,348,143 | 10/1967 | Young _____ 324—70 |

ARTHUR T. McKEON, *Primary Examiner.*

U.S. Cl. X.R.

74—731, 844